US00RE48727E

(19) United States
(12) Reissued Patent
Nelson

(10) Patent Number: US RE48,727 E
(45) Date of Reissued Patent: Sep. 14, 2021

(54) MAGNETIC SHELF

(71) Applicant: Kelly Nelson, Seatac, WA (US)

(72) Inventor: Kelly Nelson, Seatac, WA (US)

(21) Appl. No.: 29/741,209

(22) Filed: Jul. 10, 2020

Related U.S. Patent Documents

Reissue of:
(64) Patent No.: Des. 822,412
Issued: Jul. 10, 2018
Appl. No.: 29/547,218
Filed: Dec. 2, 2015

(51) LOC (13) Cl. ..... 06-06
(52) U.S. Cl.
USPC ..... D6/673; D6/574
(58) Field of Classification Search
USPC ..... D6/673, 378, 680.2, 683, 684, 512, 705, D6/538, 547, 567; D20/42; D8/380, 381
CPC .... A47F 5/0068; A47F 5/0025; A47B 96/027; B25H 3/06; B65D 1/34; B65D 21/00; B65D 2313/04
See application file for complete search history.

(56) References Cited

U.S. PATENT DOCUMENTS

D109,467 S * 5/1938 Armstrong et al. ..... D6/678
D214,300 S * 5/1969 Giesecke et al. ..... D6/683
D218,352 S * 8/1970 Hoch et al. ..... D6/683
D234,908 S * 4/1975 Maslow et al. ..... D8/381
D261,936 S * 11/1981 Sumiyasu ..... D13/183
D277,819 S * 3/1985 Crosslen ..... D6/555
D283,657 S * 5/1986 Chaplin ..... D6/675
D289,122 S * 4/1987 Meyer ..... D3/266
D299,396 S * 1/1989 Meyer ..... D6/522
D301,101 S * 5/1989 Meyer ..... D6/553
D322,181 S * 12/1991 Georgopoulos ..... D6/678
5,078,280 A * 1/1992 Nordeen ..... B25H 5/00 211/119.003
D338,685 S * 8/1993 Dakich ..... D19/92
5,638,966 A * 6/1997 Kuntz ..... A47K 10/40 211/153
5,677,030 A * 10/1997 Shanok ..... A47B 96/027 108/27

(Continued)

FOREIGN PATENT DOCUMENTS

WO 2002064457 A1 8/2002

*Primary Examiner* — Philip S Hyder
(74) *Attorney, Agent, or Firm* — Banner & Witcoff, Ltd.

(57) CLAIM

I claim the ornamental design for a magnetic shelf, as shown and described.

DESCRIPTION

*This application is an application for reissue of U.S. Pat. No. D822,412, issued on Jul. 10, 2018, which corresponds to U.S. patent application Ser. No. 29/547,218, the entire contents of which are incorporated herein by reference.*
FIG. 1 is a front view of a magnetic shelf[.];
FIG. 2 is a back view thereof[.];
FIG. 3 is a left view thereof[.];
FIG. 4 is a right view thereof[.];
FIG. 5 is a top view thereof; and,
FIG. 6 is a bottom view thereof.
[The cord on the power strip is shown broken away to indicate that it has no specific length other than what is shown.] *The broken line showings of the power strip are provided for purposes of environment and form no part of the claimed design.*

1 Claim, 6 Drawing Sheets

Matter enclosed in heavy brackets [ ] appears in the original patent but forms no part of this reissue; matter printed in italics indicates the additions made by reissue.

AMENDED

(56) References Cited

U.S. PATENT DOCUMENTS 5,699,910 A * 12/1997 Kubat ..... B25H 3/06 206/373
D405,611 S * 2/1999 Hawkins ..... D3/313
D406,478 S * 3/1999 Rahman ..... D6/683
D407,558 S * 4/1999 Huguet ..... D3/314
D416,421 S * 11/1999 Hampshire ..... D3/304
D419,301 S * 1/2000 Hampshire ..... D3/304
6,041,717 A * 3/2000 Kubat ..... B60R 11/06 108/44
D451,367 S * 12/2001 Nakamura ..... D8/330
D529,737 S * 10/2006 Terada ..... D6/678
D550,482 S * 9/2007 Belokin ..... A47F 5/0068 D6/683
D575,966 S * 9/2008 Hopkins ..... D3/313
D575,972 S * 9/2008 Shiao ..... D6/567
D579,660 S * 11/2008 Snider ..... D3/304
D589,723 S * 4/2009 Zealer ..... D6/683
D595,423 S * 6/2009 Johansson ..... D24/229
D602,722 S * 10/2009 Sandine ..... D6/553
D616,688 S * 6/2010 Hernandez ..... D6/553
D632,901 S * 2/2011 Christoffel ..... D6/683
D640,489 S * 6/2011 Tuholski ..... D6/574
D660,633 S * 5/2012 Estrup ..... D6/574
D667,633 S * 9/2012 Searcy ..... D3/313
D668,076 S * 10/2012 Gokey ..... D6/681.1
D690,533 S * 10/2013 Majcher ..... D6/574
D711,665 S * 8/2014 Mattei ..... D6/567
8,967,562 B1 * 3/2015 Bileth ..... A47G 23/0225 220/23.2
D745,817 S * 12/2015 Amash ..... D8/71
D757,184 S * 5/2016 Balanchi ..... D21/404
D771,044 S * 11/2016 Nguyen ..... D14/385
D775,466 S * 1/2017 Wang ..... D3/304
D775,827 S * 1/2017 Wang ..... D3/304
D775,828 S * 1/2017 Wang ..... D3/304
D775,829 S * 1/2017 Wang ..... D3/304
D775,931 S * 1/2017 van Hillo ..... D8/349
D776,965 S * 1/2017 Anderson ..... D6/705
2006/0283819 A1 * 12/2006 Larsen ..... A47F 1/12 211/59.2

* cited by examiner

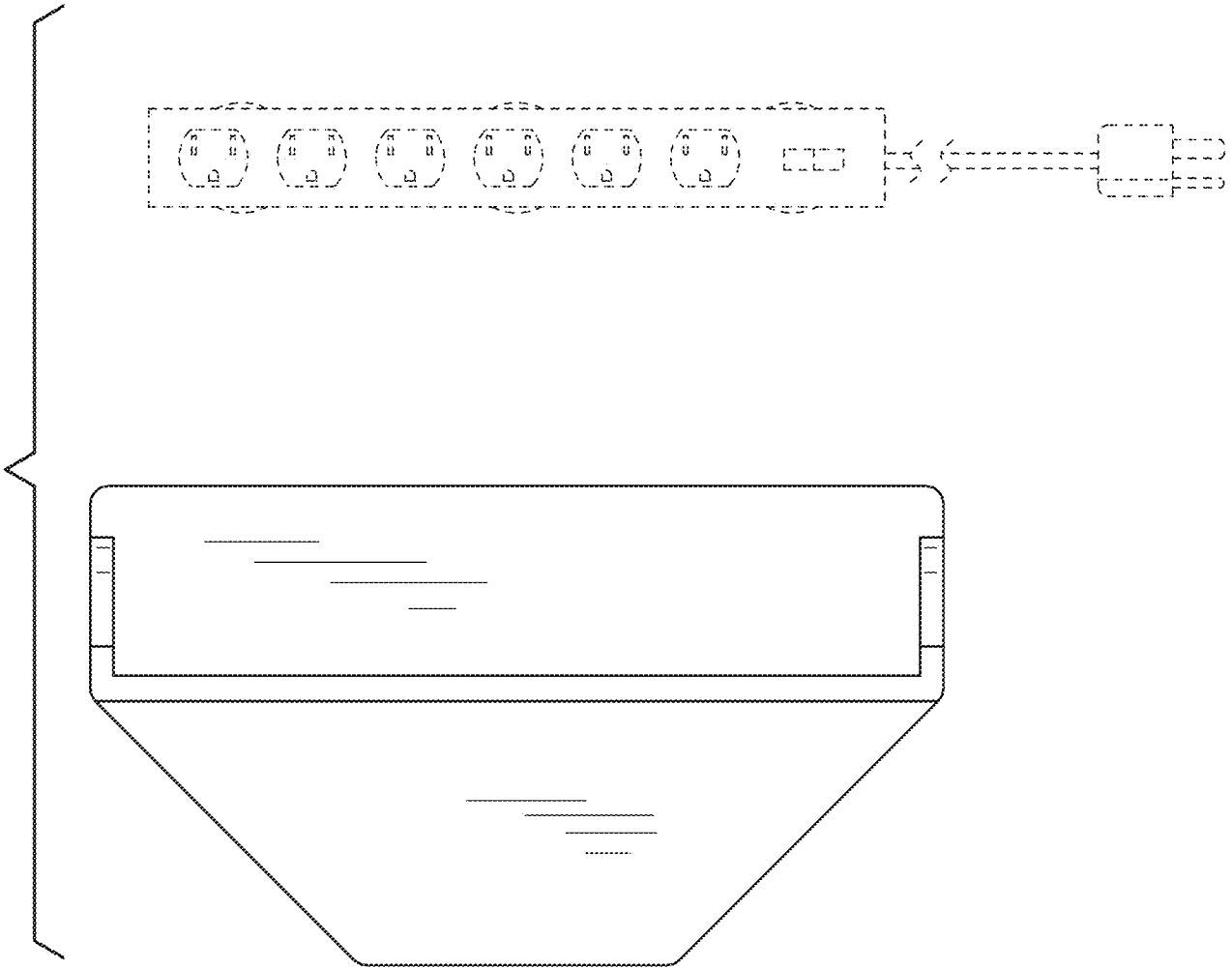
FIG. 1
AMENDED

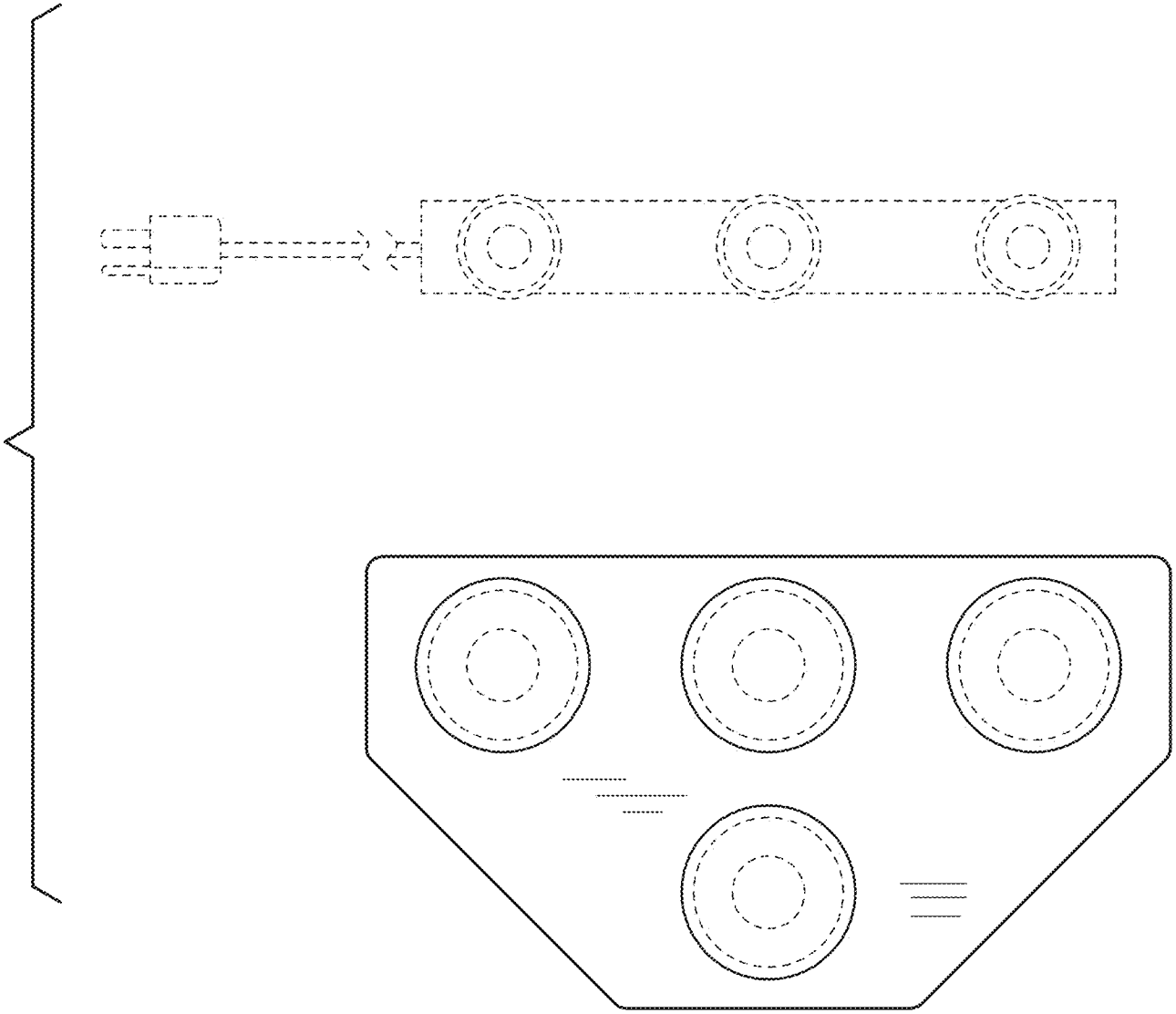
FIG. 2
AMENDED

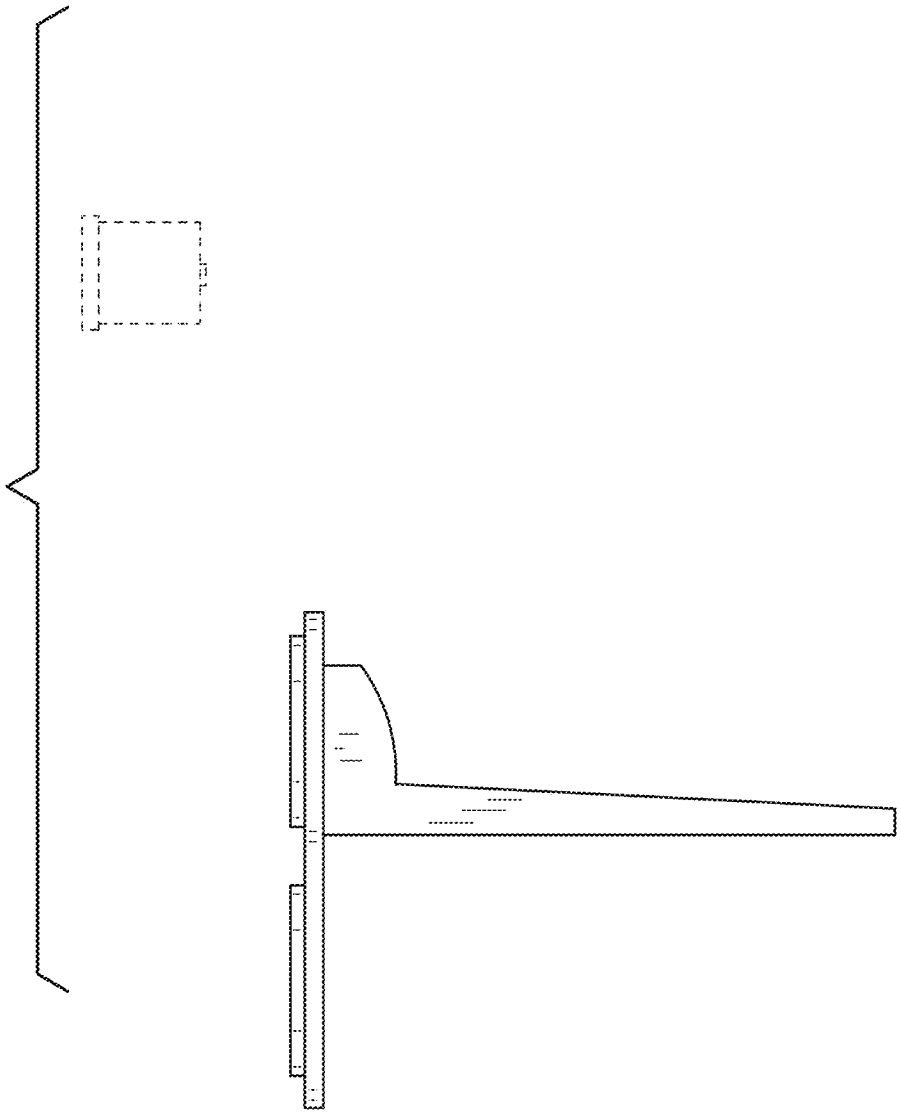
FIG. 3
AMENDED

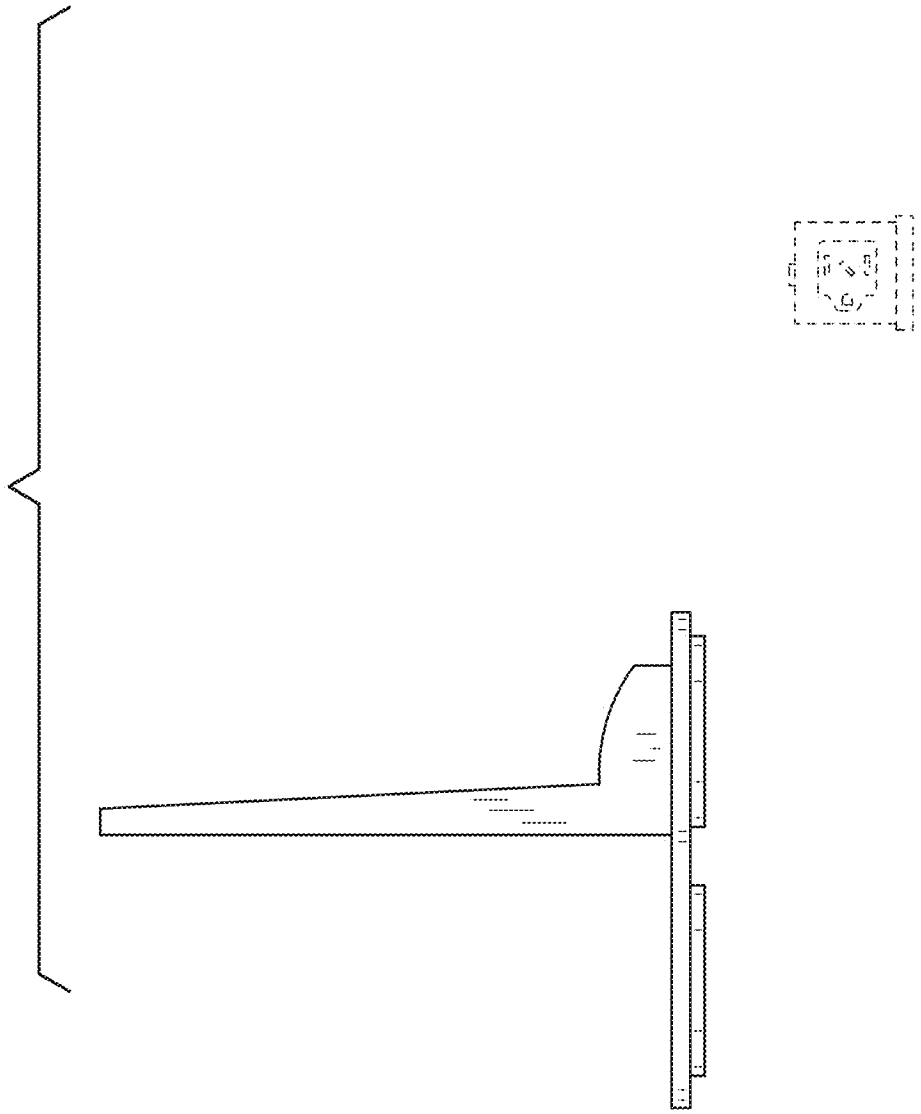
FIG. 4
AMENDED

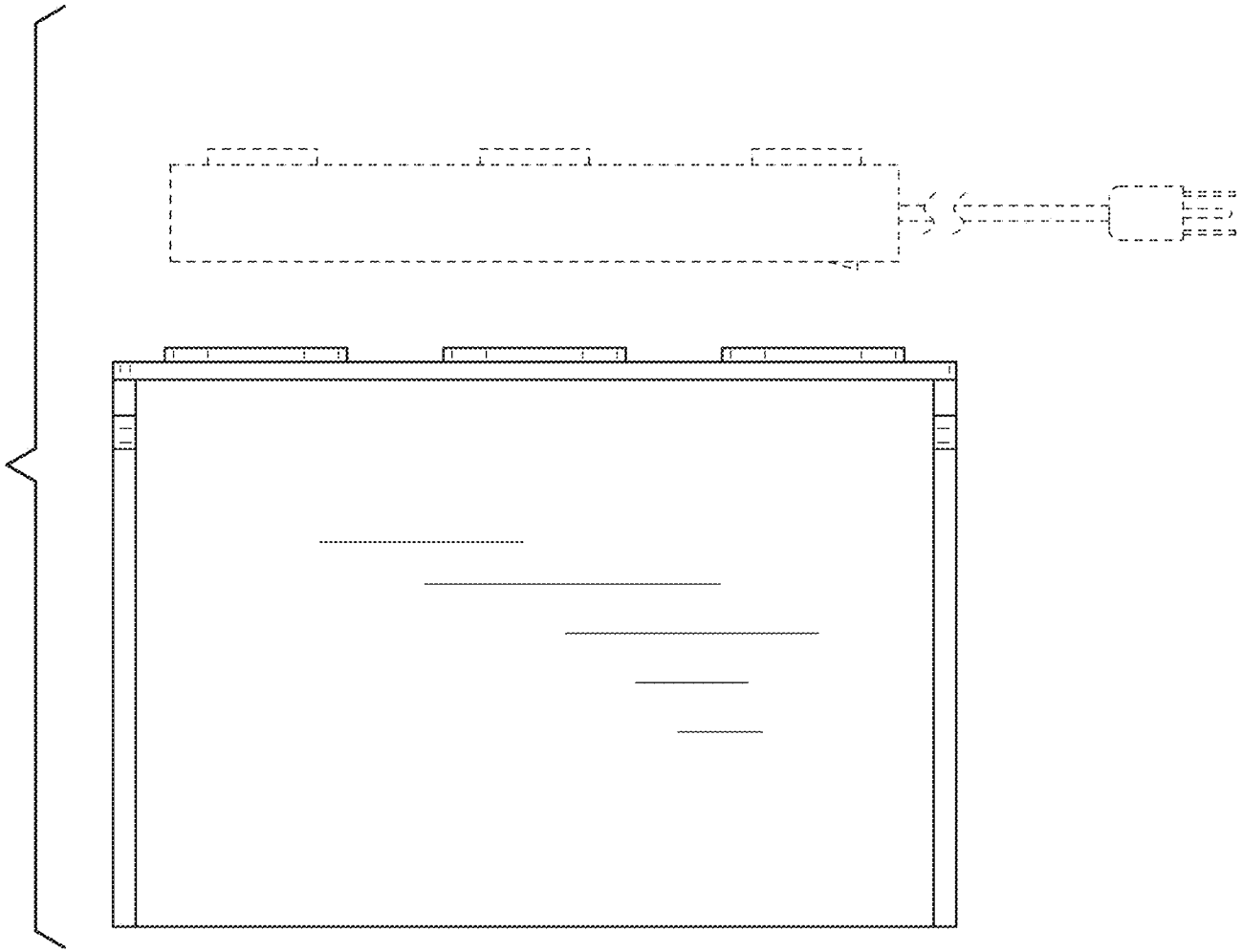
FIG. 5
AMENDED

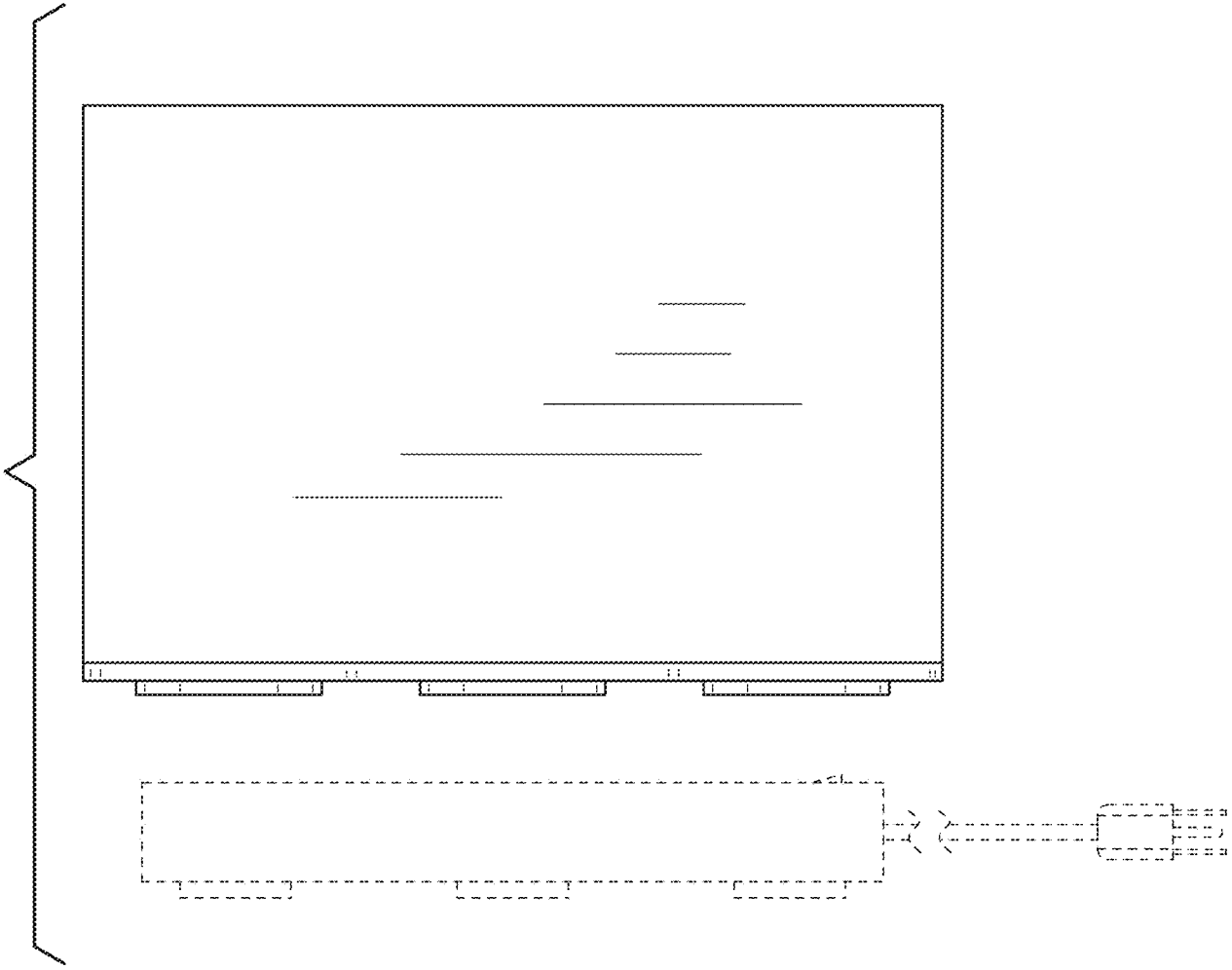
FIG. 6
AMENDED